UNITED STATES PATENT OFFICE.

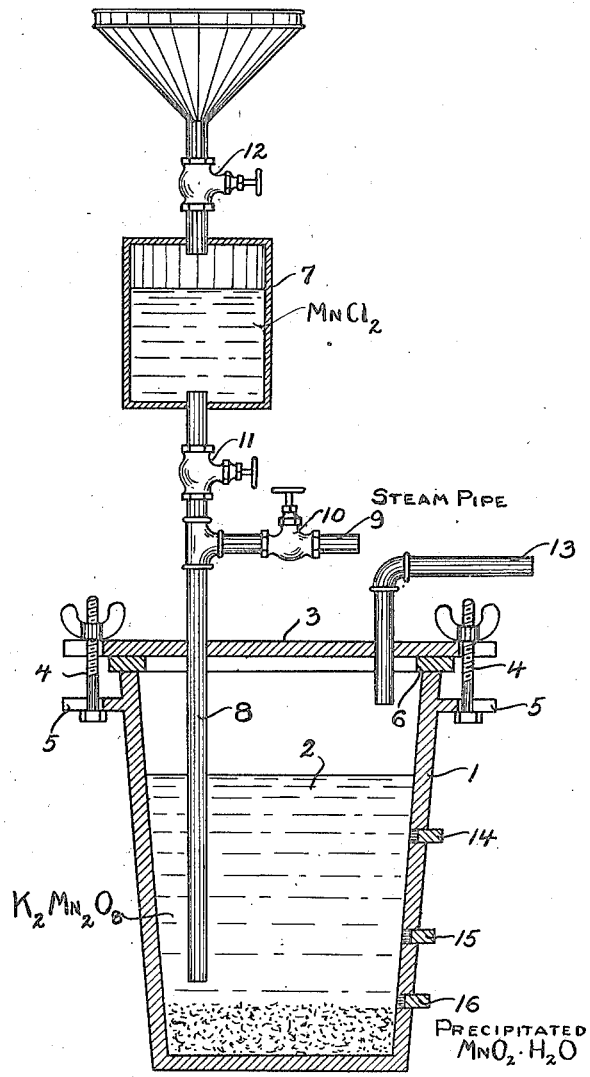

MAJOR E. HOLMES, OF LAKEWOOD, OHIO, ASSIGNOR TO NATIONAL CARBON COMPANY, OF CLEVELAND, OHIO, A CORPORATION OF NEW JERSEY.

PROCESS FOR MAKING BATTERY-DEPOLARIZING MATERIAL.

1,184,854.        Specification of Letters Patent.        Patented May 30, 1916.

Application filed November 21, 1912. Serial No. 732,615.

*To all whom it may concern:*

Be it known that I, MAJOR E. HOLMES, a citizen of the United States, residing at Lakewood, in the county of Cuyahoga and State of Ohio, have invented a certain new and useful Improvement in Processes for Making Battery-Depolarizing Material, of which the following is a full, clear, and exact description.

My invention relates to depolarizers for dry batteries and particularly for that type known as "midget" batteries.

Pyrolusite or manganese peroxid as it occurs in nature is used as a depolarizer in dry cells of ordinary size, but conditions met with in the small "midget" dry cells are so different that pyrolusite produces a very inferior cell if used as a depolarizer in the latter. I have found that if a specially prepared manganese peroxid be used in the midget form of dry cell, the cell will be very much improved. The continuous service life, for instance, is four or five times as great as it would be if pyrolusite were used as depolarizer. The process by which I make this special form of manganese peroxid will be set forth in the appended description.

In the drawing, the single figure illustrates apparatus for carrying out my process.

If to a solution of potassium permanganate a solution of manganese chlorid is added, hydrated manganese peroxid will be precipitated, but if this is precipitated at temperatures much below 100 degrees C. it is very inferior as a depolarizer in the midget type of dry cells. I find that the depolarizer is more efficient if precipitated from a solution that is substantially at a temperature of 100 degrees C. I prefer to procure this temperature by the use of steam, as the steam aids in decreasing the density of the precipitate.

Referring to the drawing, a receptacle 1 contains potassium permanganate solution 2. This receptacle has a removable cover 3 held down by bolts 4 which engage lugs 5 of the receptacle and pass through openings in the cover. A gasket 6 is placed between the cover and the body of the receptacle to make a tight fit. The manganese chlorid solution is contained in a receptacle 7 and is led down into the manganate solution through a pipe 8. I find that best results are obtained when the manganese chlorid solution is admitted into the manganate solution near the bottom of the receptacle, and hence the pipe 8 should clear the bottom only enough to provide room for the precipitate. Steam is preferably admitted into the interior of the receptacle through the pipe 8. A pipe 9 is connected thereto for this purpose. Valves 10, 11 and 12 are used to control the flow through the pipes in which they are located. A pipe 13 conveys away chlorin which is formed in the process. The solution is removed from the receptacle by removing any one of the plugs 14, 15 and 16.

The potassium permanganate is first raised to approximately 100 degrees C. by blowing in steam through pipes 9 and 8, the valve 10 being open and the valve 11 shut. As soon as the proper temperature is reached valve 10 is closed and valves 11 and 12 opened. When a small amount of manganese chlorid has passed into the potassium permanganate solution, valves 11 and 12 are closed and valve 10 opened, admitting more steam. This process of alternating the admission of steam and manganese chlorid is continued until the permanganate solution is substantially exhausted. The reaction taking place is represented by the following equation.

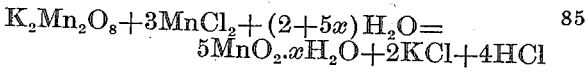
$$K_2Mn_2O_8 + 3MnCl_2 + (2+5x)H_2O = 5MnO_2 \cdot xH_2O + 2KCl + 4HCl$$

The precipitated manganese oxid is hydrated, the amount of water uniting with it being represented by $x$. Some of the hydrochloric acid reacts with the manganese peroxid to produce chlorin in accordance with the following equation.

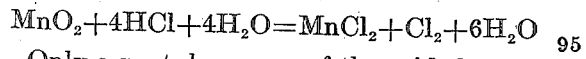
$$MnO_2 + 4HCl + 4H_2O = MnCl_2 + Cl_2 + 6H_2O$$

Only a part, however, of the acid thus reacts with the manganese peroxid. The chlorin aids in oxidizing the lower oxids of manganese, the following being a typical reaction.

$$Mn_3O_4 + 4Cl + 2H_2O = 3MnO_2 + 4HCl$$

Since the lower oxids are formed to some extent the chlorin has a beneficial influence. If steam is admitted continuously to the potassium permanganate solution through separate pipes while manganese chlorid solution is being admitted, the product is very fluffy and the apparent density is too low. To obtain a depolarizer of the best density it is therefore necessary to alternate the admission of steam and manganese chlorid as described. After the desired amount of precipitate is obtained the liquid is drained off through the openings and the precipitate removed. This precipitate is dried at approximately 120 degrees C. and afterward calcined for about seven hours in the neighborhood of 300 degrees C. The calcination is necessary in order to dehydrate the precipitate as it reacts with the ammonium chlorid in the cell electrolyte to produce hydrochloric acid, which attacks the zinc electrode though the calcination will obviously be omitted when the hydrated form is to be used as the depolarizer.

Instead of using manganese chlorid as one of the solutions, I may use other manganese salts such as the sulfate for instance, but I prefer to use the chlorid on account of the oxidizing effect of the free chlorin, as previously described.

My divisional application Serial No. 780,674, filed July 23, 1913, covers the use of the product in a dry cell, and the claims in this case are therefore directed to the process disclosed herein.

Having described my invention what I claim is:

1. The process of preparing a battery depolarizer which consists in precipitating manganese peroxid from a heated solution of potassium permanganate and a manganous salt.

2. The process of preparing a battery depolarizer which consists in adding manganese chlorid to a solution of potassium permanganate, and admitting steam thereto to heat the solutions and mix the reacting substances.

3. The process of preparing a battery depolarizer which consists in alternately adding steam and manganese chlorid to a hot permanganate solution to precipitate hydrated manganese peroxid.

4. The process of preparing a battery depolarizer which consists in maintaining a permanganate solution approximately between 90° and 100° C., adding a manganous salt thereto and agitating the solutions while the hydrated manganese peroxid is precipitated.

5. The process of preparing a battery depolarizer which consists in precipitating hydrated manganese peroxid and then removing the water of hydration from the precipitate.

6. The process of preparing a battery depolarizer which consists in oxidizing a manganous salt with a permanganate and calcining the resulting manganese peroxid.

7. The process of preparing a battery depolarizer which consists in precipitating hydrated manganese peroxid from a solution of potassium permanganate and manganese chlorid and calcining the precipitate.

8. The process of preparing a battery depolarizer which consists in adding manganese chlorid to a solution of potassium permanganate, admitting steam thereto and calcining the precipitate.

9. The process of preparing a battery depolarizer which consists in adding steam and manganese chlorid intermittently to a solution of potassium permanganate and calcining the precipitate above 200 degrees C.

In testimony whereof, I hereunto affix my signature.

MAJOR E. HOLMES.

Witnesses:
I. J. ADAMS,
H. G. GROVER.